(12) United States Patent
Anbananthan

(10) Patent No.: US 8,718,443 B2
(45) Date of Patent: May 6, 2014

(54) IMPLEMENTING WEB BROWSER IN BD PLATFORM

(75) Inventor: Saravana Prabhu Anbananthan, Los Angeles, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 196 days.

(21) Appl. No.: 12/904,105

(22) Filed: Oct. 13, 2010

(65) Prior Publication Data

US 2012/0093480 A1   Apr. 19, 2012

(51) Int. Cl.
*H04N 9/80* (2006.01)

(52) U.S. Cl.
USPC ................. 386/240; 386/E5.001; 715/234

(58) Field of Classification Search
USPC ............................ 386/240, E5.001; 715/234
See application file for complete search history.

(56) References Cited

U.S. PATENT DOCUMENTS

| | | |
|---|---|---|
| 6,941,520 B1 | 9/2005 | Lewallen |
| 2003/0184584 A1 | 10/2003 | Vachuska et al. |
| 2005/0010689 A1* | 1/2005 | Henry et al. .................. 709/246 |
| 2006/0140079 A1* | 6/2006 | Hamada et al. .............. 369/47.1 |

* cited by examiner

*Primary Examiner* — Thai Tran
*Assistant Examiner* — Girumsew Wendmagegn
(74) *Attorney, Agent, or Firm* — Procopio, Cory, Hargreaves & Savitch, LLP

(57) ABSTRACT

Implementing a web browser in a BD platform, including: receiving a HyperText Markup Language (HTML) page of a web browser; converting the HTML page including user interface (UI) widgets into graphical elements including HAVi widgets; and displaying the HTML page in the BD platform. Keywords include HAVi, Widgets, and BD platform.

15 Claims, 8 Drawing Sheets

IMPLEMENTING WEB BROWSER IN BD PLATFORM

BACKGROUND

1. Field of the Invention

The present invention relates to Blu-ray disc players, and more specifically, to implementing a web browser in the Blu-ray Disc Java (BD) platform.

2. Background

A function such as Blu-ray Disc Live (BD-Live) for downloading content over a network is defined in the Blu-ray Disc Read-Only Memory (BD-ROM) specification. An optical disc playback device (e.g., a Blu-ray disc player) for playing back content recorded on a BD-ROM or other medium is able to make use of the BD-Live function by executing a title that has been authored using a Blu-ray Disc Java (BD-J) program. That is, the authored title is a software package that includes various types of data, such as content data and programs.

The BD-J specification also includes a "Virtual Package" function, whereby original content stored on packaged media is read and played back simultaneously with additional content that has been downloaded and stored on a recording medium. Accordingly, the BD player gives the appearance of playing back an up-to-date, virtual BD-ROM medium. The Virtual Package function also includes functions for managing additional content as well as modifying graphical user interface (GUI) menus according to content updates.

By utilizing the above BD-Live function, the content provider that provides a particular BD-J title is able to keep the content included in that BD-J title up-to-date, even after a user has purchased the BD-ROM media. A BD player that plays back the BD-J title is thus able to, for example, download additional content such as the latest trailer clips, subtitle data for new languages, special footage, and games from a server (e.g., a Web site) provided by the content provider, and subsequently store such content on a recording medium such as a hard disk drive (HDD) or flash memory. However, in some cases, the BD-Live function can be achieved more easily by using a web browser in the BD-J platform.

SUMMARY

The present invention provides for implementing a web browser in a BD platform.

In one implementation, a method of implementing a web browser in a BD platform is disclosed. The method includes: receiving a HyperText Markup Language (HTML) page of a web browser; converting the HTML page including user interface (UI) widgets into graphical elements including HAVi widgets; and displaying the HTML page in the BD platform.

In another implementation, a web browser implemented in a BD platform of a Blu-ray disc player for executing optical disc functions is disclosed. The web browser includes: a converter to convert an HTML page of the web browser including UI widgets into graphical elements including HAVi widgets; and a display to display the HTML page in the BD platform.

In a further implementation, a non-transitory storage medium storing a computer program for implementing a web browser in a BD platform is disclosed. The computer program includes executable instructions that cause a computer to: receive an HTML page of a web browser; convert the HTML page including UI widgets into graphical elements including HAVi widgets; and display the HTML page in the BD platform.

Other features and advantages of the present invention will become more readily apparent to those of ordinary skill in the art after reviewing the following detailed description and accompanying drawings.

DETAILED DESCRIPTION

Currently there is no web browser implementation in the Blu-ray Disc Java (BD) platform. However, the BD platform supports a user interface (UI) programming technique referred to as Home Audio/Video interface (HAVi) which allows consumer electronics and home appliances that comply with the HAVi specification to communicate with each other. HAVi is a digital audio/video networking interface that provides a home networking software specification for seamless interoperability among home entertainment products. Accordingly, a programming technique involving HAVi "widgets" can be used to implement a web browser in the BD platform.

Certain implementations as disclosed herein provide for implementing a web browser in the BD platform. In one implementation, the HTML-based UI widgets are mapped to HAVi widgets to enable a quick porting of the web browser software into the BD platform. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Developing a new web browser is a time consuming and expensive effort because web browsers are complex software modules which involve adherence to several standards. Thus, without a web browser on the BD platform, Blu-ray Disc Live (BD-Live) use cases that can be performed easily using a web browser are currently being implemented as distinct non-interoperable software modules. Although there are Java-based web browsers available that are Java code compliant, the UI code for these web browsers uses either Java Abstract Window Toolkit (AWT) components or Java Foundation Classes (JFC) Swing implementations. Since these components are not supported in the BD platform, the porting of the browsers is not directly feasible.

In one implementation, the HTML-based UI widgets (AWT/Swing) are mapped to the HAVi widgets such as buttons and text boxes, thus enabling a port of the Web Browser software. In other implementations, this porting technique can be extended to implement software other than web browsers. For example, the same technique can be used to map/port an e-mail application to the BD platform.

Figure 1:
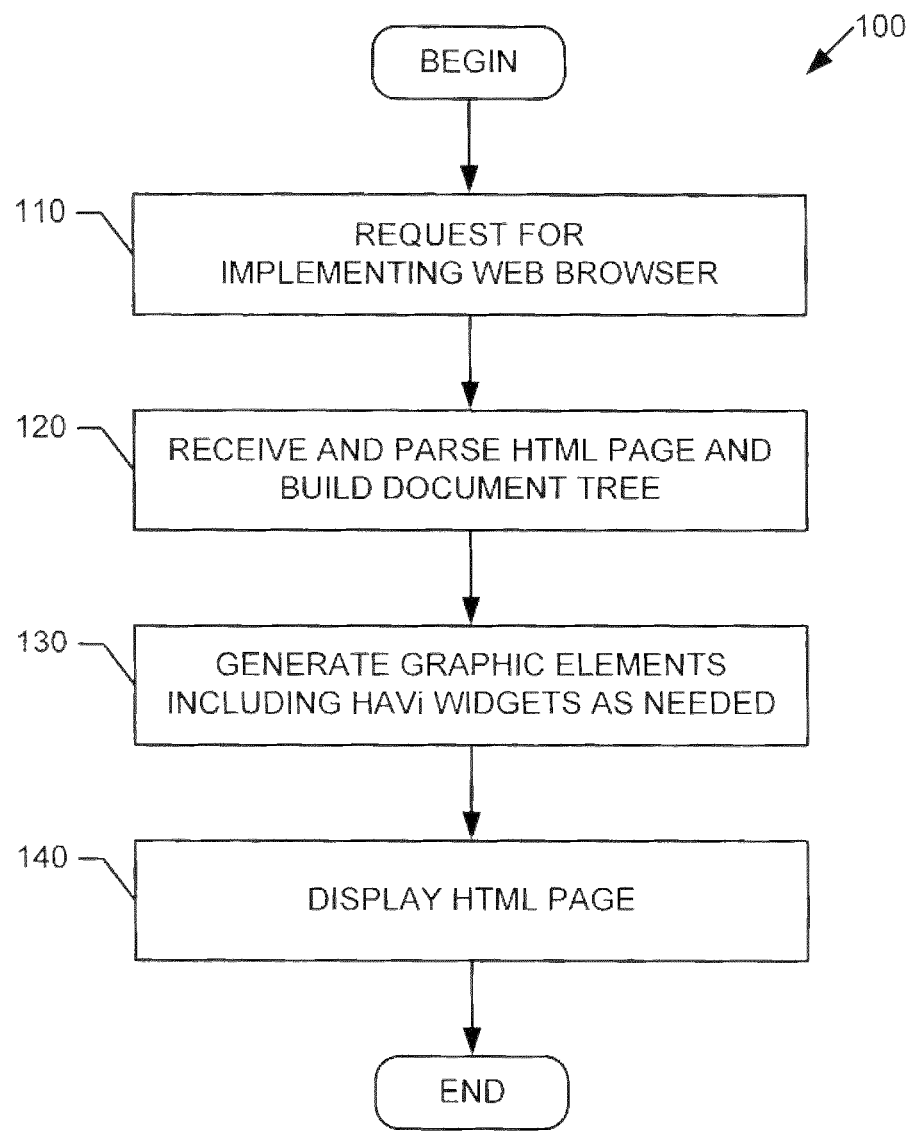
FIG. 1 is a flowchart illustrating a process for implementing a web browser in the BD platform in accordance with one implementation of the present invention.
Figure 2:
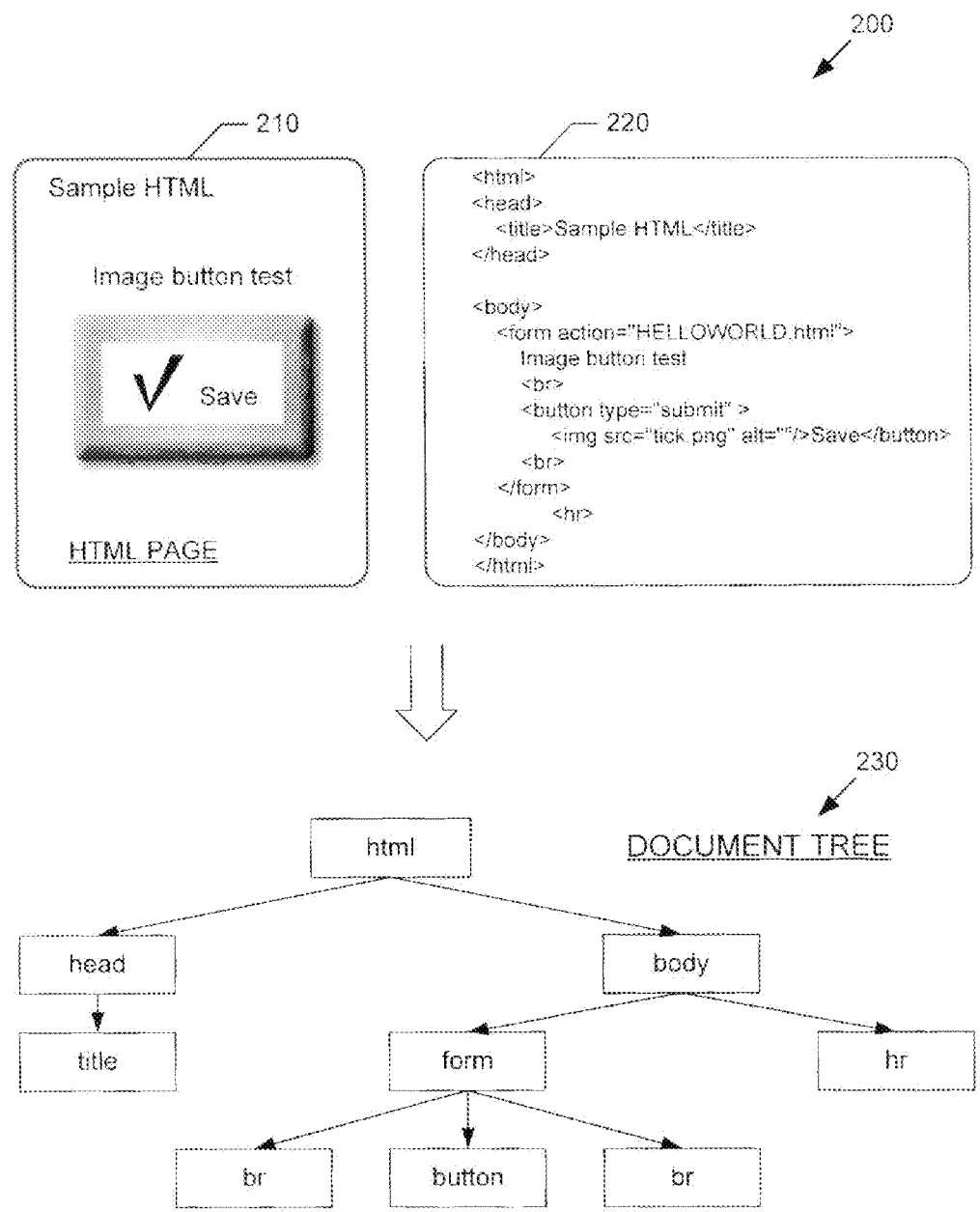
FIG. 2 shows an example document tree building process illustrating one example of parsing UI widgets of an HTML page into HAVi widgets using a document tree.

FIG. 1 is a flowchart 100 illustrating a process for implementing a web browser in the BD platform in accordance with one implementation of the present invention. In the illustrated implementation of FIG. 1, a request for implementing a web browser in the BD platform is received, at box 110. The request may come in the form of a click or selection of a web browser icon or menu item. The HTML page of the web browser is then received and parsed, at box 120, to build a document tree which can include a list of UI widgets of the HTML page. For example, FIG. 2 shows an example document tree building process 200 that builds an HTML page document tree 230 based on an HTML file 220 and a corresponding HTML page 210.

Figure 3:
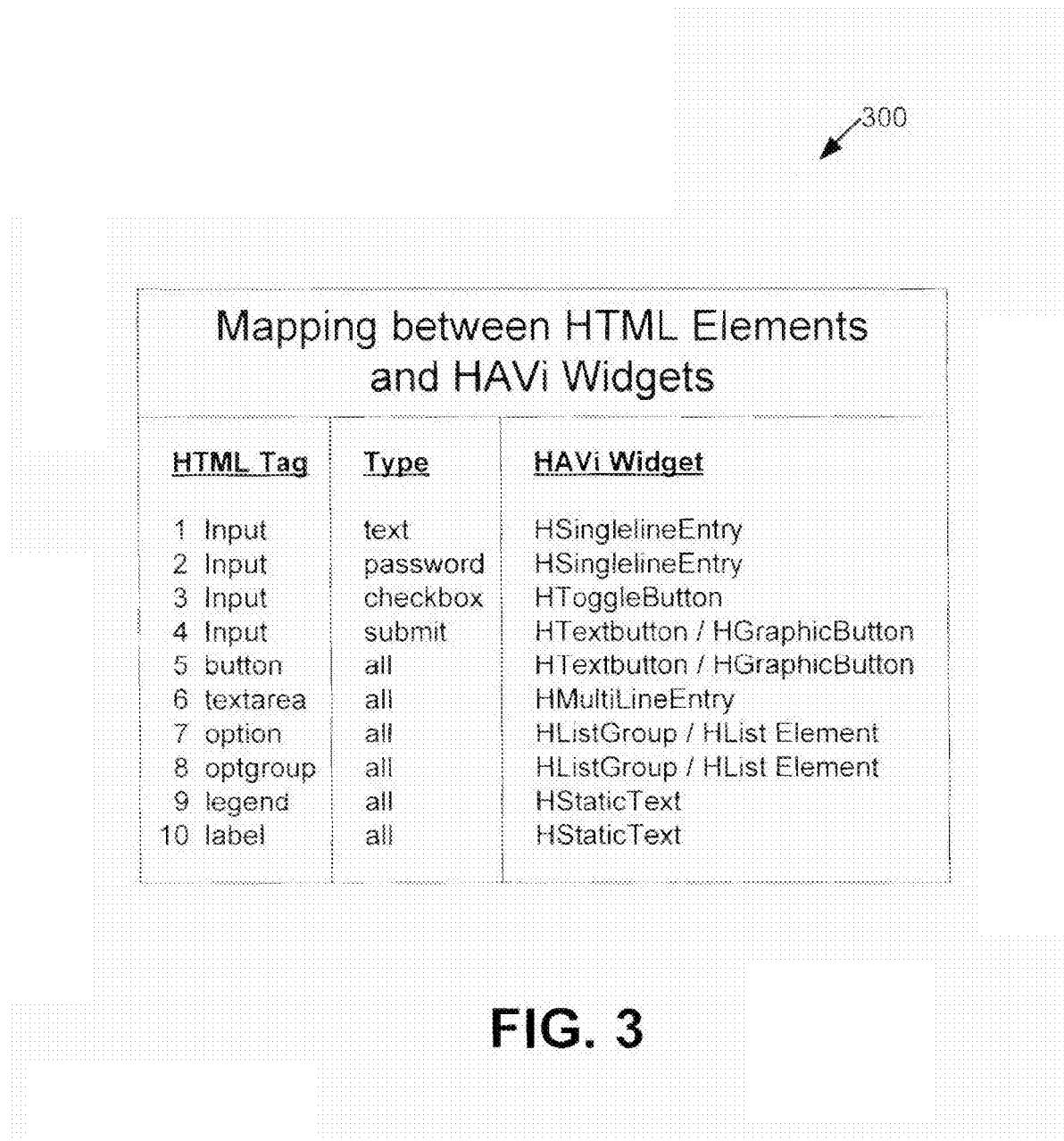
FIG. 3 shows an example table of a mapping between the UI widgets of the HTML page and the HAVi widgets.

Graphical elements corresponding to the UI widgets of the document tree are generated, at box 130. In one implementation, each mapped graphical element corresponds to one UI widget of the document tree. In one implementation, the graphical elements include HAVi widgets needed to build a web browser in the BD platform. FIG. 3 shows an example table 300 of a mapping between the UI widgets of the HTML page and the HAVi widgets. For example, the table maps the "text input" in the HTML page to HSinglelineEntry of the HAVi widget. In another example, all types of the "textarea" HTML widget are mapped to HMultiLineEntry of the HAVi widget. Once all of the UI widgets of the document tree are mapped to graphical elements of HAVi widgets, the HTML page is then displayed, at box 140.

Figure 4:
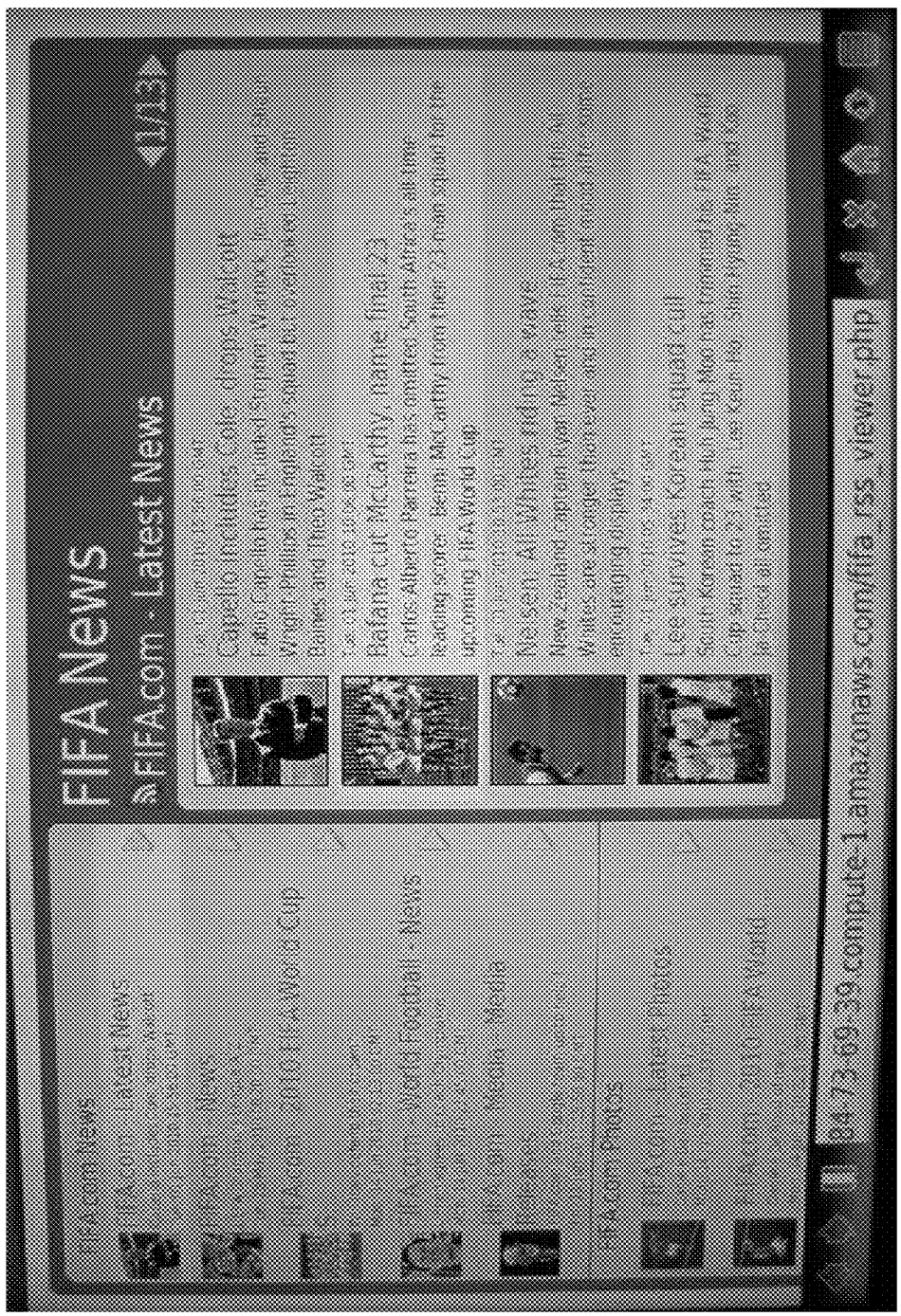
FIG. 4, FIG. 5, and FIG. 6 show screen shots of the HTML page display in the BD platform.
Figure 5:
Figure 6:
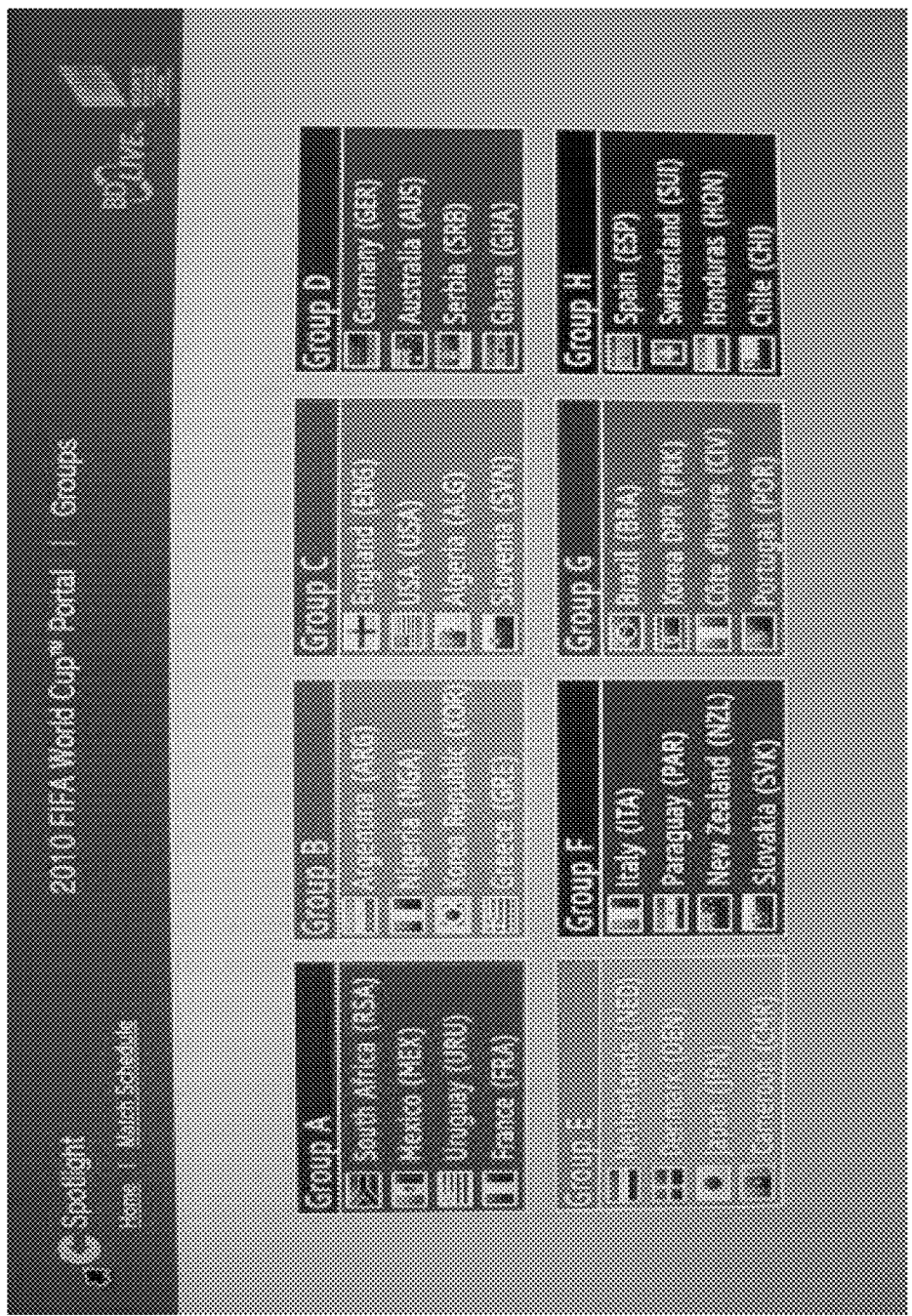

FIG. 4, FIG. 5, and FIG. 6 show screen shots of the HTML page display in the BD platform. As can be seen in the screen shots, the HTML page in the BD platform displays the same information in a substantially similar manner with slightly different graphical icons.

Figure 7:
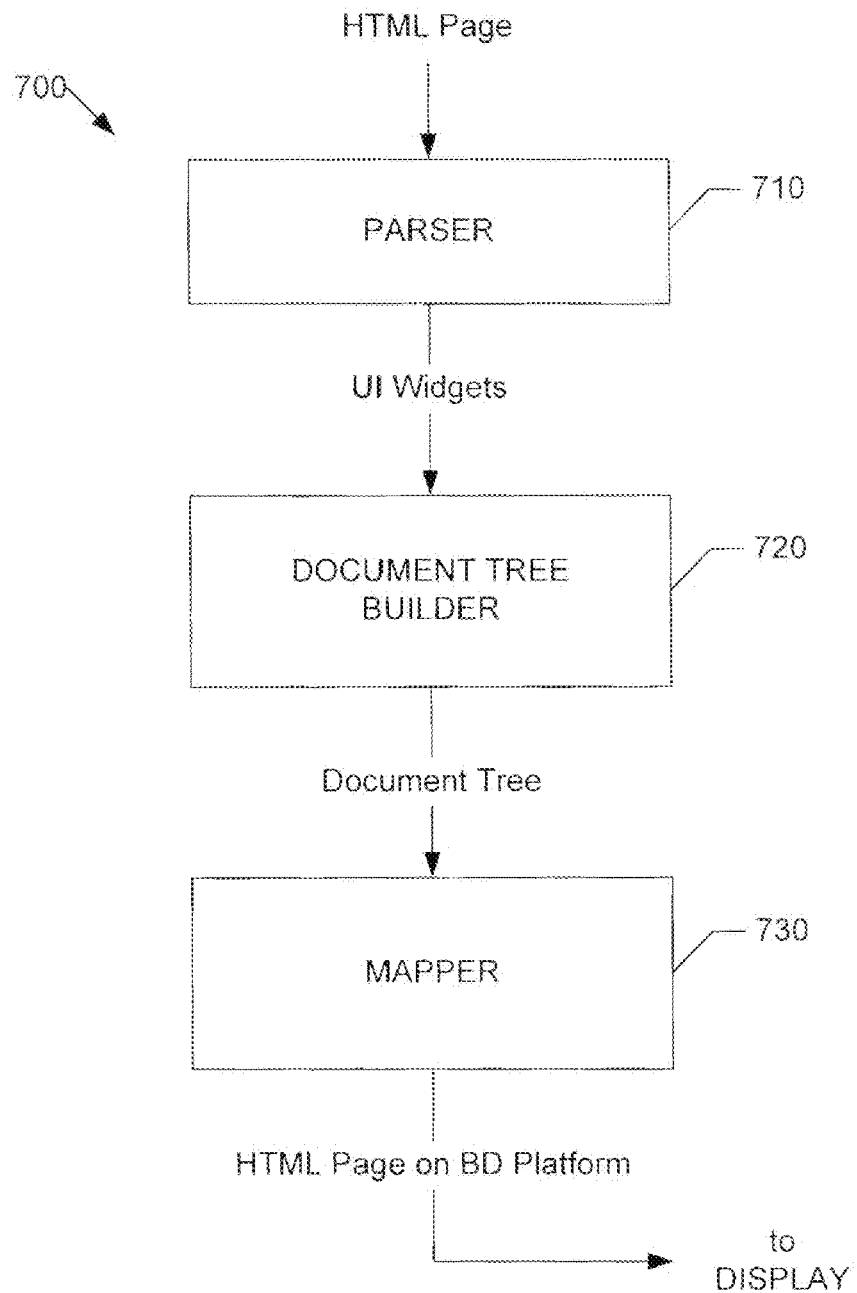
FIG. 7 shows one implementation of a system configured to implement a web browser in the BD platform.

FIG. 7 shows one implementation of a converter system 700 configured to implement a web browser in the BD platform. In one implementation, the converter system 700 is a web browser implementation on a Blu-ray disc player. In the illustrated implementation of FIG. 7, the system 700 includes a parser 710, a document tree builder 720, and a mapper 730. Once the HTML page of the web browser is received subsequent to a request to implement a web browser in the BD platform, the parser 710 parses the HTML page into UI widgets. The document tree builder 720 receives the parsed UI widgets and builds the document tree. Once the document tree is built, it is transmitted to the mapper 730. The mapper 730 receives the document tree and generates graphical elements corresponding to the UI widgets. In one implementation, the graphical elements include HAVi widgets needed to build a web browser in the BD platform. Once all of the UI widgets of the document tree are mapped to the graphical elements of HAVi widgets, the HTML page is then displayed on a display.

Figure 8A:
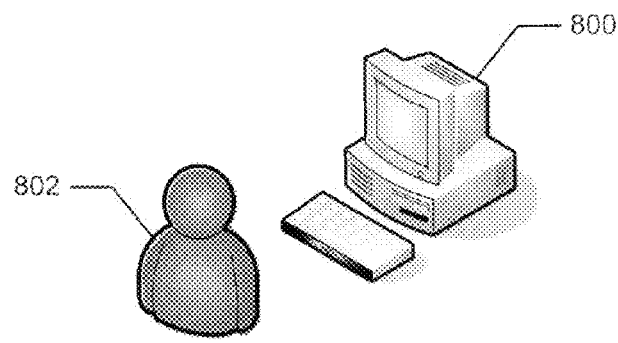
FIG. 8A illustrates a representation of a computer system and a user.

FIG. 8A illustrates a representation of a computer system 800 and a user 802. The user 802 uses the computer system 800 to implement a web browser in the BD platform. The computer system 800 stores and executes a BD platform web browser system 890.

Figure 8B:
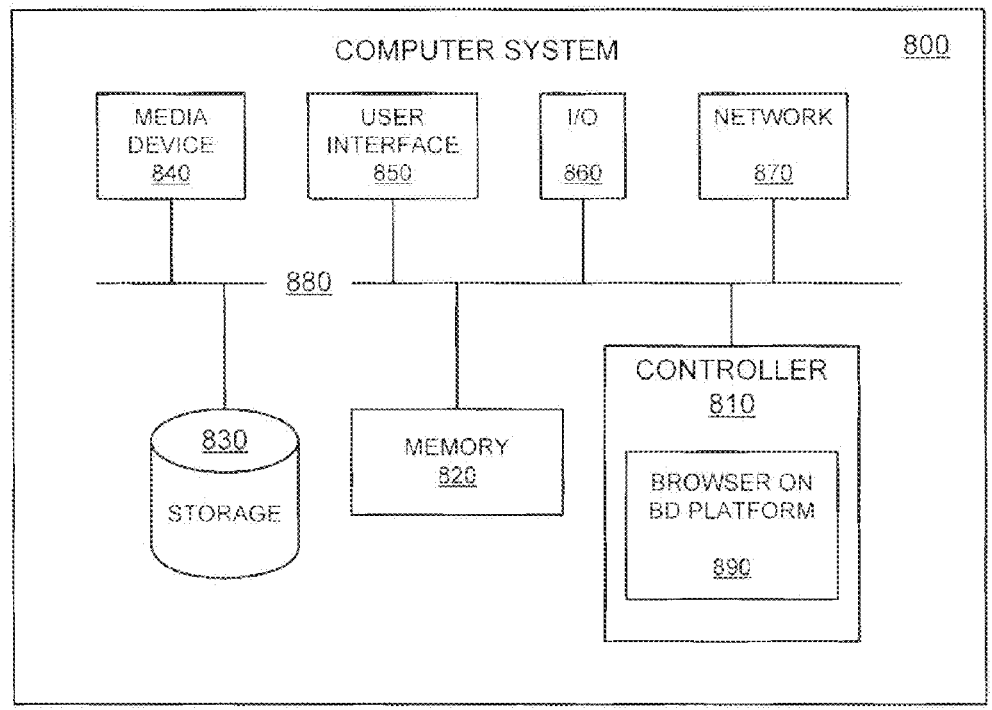
FIG. 8B is a functional block diagram illustrating the computer system hosting the BD platform web browser system.

FIG. 8B is a functional block diagram illustrating the computer system 800 hosting the BD platform web browser system 890. The controller 810 is a programmable processor and controls the operation of the computer system 800 and its components. The controller 810 loads instructions (e.g., in the form of a computer program) from the memory 820 or an embedded controller memory (not shown) and executes these instructions to control the system. In its execution, the controller 810 provides the BD platform web browser system 890 as a software system. Alternatively, this service can be implemented as separate hardware components in the controller 810 or the computer system 800.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by other components of the computer system 800, such as for storing data used by the BD platform web browser system 890. In one implementation, storage 830 is a hard disk drive.

The media device 840 receives removable media and reads and/or writes data to the inserted media. In one implementation, for example, the media device 840 is an optical disc drive.

The user interface 850 includes components for accepting user input from the user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (including, but not limited to 802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss porting a web browser to the BD platform. However, in other implementations, the porting technique can be extended to porting of other software from the HTML platform to the BD platform. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of implementing a web browser in a Blu-ray platform, comprising:

receiving a HyperText Markup Language (HTML) page of a web browser;

parsing the HTML page into user interface (UI) widgets;

mapping the parsed UI widgets into graphical elements including home audio/video widgets, wherein the home audio/video widgets are widgets used in systems conforming to the home audio/video interoperability specification, and are needed to build the browser in the Blu-ray platform: and displaying the HTML page in the Blu-ray platform using the home audio/video widgets.

2. The method of claim 1, further comprising building a document tree using the parsed UI widgets.

3. The method of claim 1, wherein the document tree includes a list of the parsed UI widgets.

4. The method of claim 1, wherein each mapped graphical element corresponds to one UI widget of the document tree.

5. The method of claim 1, wherein mapping the parsed UI widgets into the home audio/video widgets includes providing a table which provides one to one correspondence between the UI widgets and the home audio/video widgets.

6. A web browser implemented in a Blu-ray platform of a Blu-ray disc player for executing optical disc functions, the web browser comprising:

a parser to parse an HTML page of the web browser into UI widgets;

a document tree builder configured to receive the parsed UI widgets and to build a document tree;

a mapper to receive the document tree and generate graphical elements including home audio/video widgets corresponding to the UI widgets, wherein the home audio/video widgets are widgets used in systems conforming to the home audio/video interoperability specification, and are needed to build the web browser in the Blu-ray platform; and a display to display the HTML page in the Blu-ray platform using he home audio/video widgets.

7. The web browser of claim 6, wherein the parser parses the HTML page into the UI widgets when the HTML page of the web browser is received subsequent to a request to implement the web browser in the Blu-ray platform.

8. The web browser of claim 6, wherein the document tree includes a list of the parsed UI widgets.

9. The web browser of claim 6, wherein each mapped graphical element corresponds to one UI widget of the document tree.

10. The web browser of claim 6, wherein the mapper includes a table which provides one to one correspondence between the UI widgets and the home audio/video widgets.

11. A non-transitory storage medium storing a computer program for implementing a web browser in a Blu-ray platform, the computer program comprising executable instructions that cause a computer to:

receive an HTML page of a web browser;

parse the HTML page into UI widgets;

map the parsed UI widgets into graphical elements including home audio/video widgets, wherein the home audio/video widgets are widgets used in systems conforming to the home audio/video interoperability specification, and are needed to build the web browser in the Blu-ray platform; and display the HTML page in the Blu-ray platform using the home audio/video widgets.

12. The non-transitory storage medium of claim 11, further comprising executable instructions that cause a computer to:

build a document tree using the parsed UI widgets.

13. The non-transitory storage medium of claim 12, wherein each mapped graphical element corresponds to one UI widget of the document tree.

14. The non-transitory storage medium of claim 12, wherein the document tree includes a list of the parsed UI widgets.

15. The non-transitory storage medium of claim 11, wherein executable instructions that cause a computer to map the parsed UI widgets into the home audio/video widgets comprise executable instructions that cause a computer to:

provide a table having one to one correspondence between the UI widgets and the home audio/video widgets.

* * * * *